(12) United States Patent
Norlund et al.

(10) Patent No.: US 8,660,083 B2
(45) Date of Patent: Feb. 25, 2014

(54) UPLINK SCHEDULING IN A CELLULAR SYSTEM

(75) Inventors: Krister Norlund, Gothenburg (SE); Kelvin Maliti, Marsta (SE); Anders Persson, Kode (SE); Ying Sun, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 744 days.

(21) Appl. No.: 12/989,670

(22) PCT Filed: Apr. 28, 2008

(86) PCT No.: PCT/SE2008/050485
§ 371 (c)(1),
(2), (4) Date: Oct. 26, 2010

(87) PCT Pub. No.: WO2009/134172
PCT Pub. Date: Nov. 5, 2009

(65) Prior Publication Data
US 2011/0038341 A1 Feb. 17, 2011

(51) Int. Cl.
*H04W 72/14* (2009.01)
(52) U.S. Cl.
USPC .......................................................... 370/330
(58) Field of Classification Search
USPC .......................................................... 370/330
See application file for complete search history.

(56) References Cited

U.S. PATENT DOCUMENTS

| | | |
|---|---|---|
| 2007/0258540 A1 | 11/2007 | Ratasuk et al. |
| 2008/0080472 A1 | 4/2008 | Bertrand et al. |
| 2010/0290419 A1* | 11/2010 | Wengerter .................... 370/329 |

OTHER PUBLICATIONS

Panasonic, R1-074912, 'PDCCH Signaling for retransmission of downlink persistent scheduling', 3GPP TSG-RAN WG1 Meeting #51, Nov. 2007, pp. 1-3.*
3rd Generation Partnership Project. "Uplink Synchronous HARQ and RACH." 3GPP TSG RAN WG2 #60bis, Tdoc R2-080222, Sevilla, Spain,, Jan. 14-18, 2008.

* cited by examiner

*Primary Examiner* — Melvin Marcelo
(74) *Attorney, Agent, or Firm* — Coats & Bennett, PLLC

(57) ABSTRACT

A method (1000) for scheduling uplink transmission resources such as transmission duration and frequency to users (120) in a cell (110) of a cellular system (100). Grants for the use of uplink transmission resources are sent (1005) on a downlink control channel to users in the cell and the users' uplink transmissions are sent (1010) in subframes which have a certain extension in time and frequency. For each of at least a number of subframes, a decision (1015) is made on the number of users that will be scheduled resources for uplink transmission in the subframe, so that said number of users is maximized (1020) with respect to the control channel's capacity to transmit uplink grants for that subframe.

18 Claims, 11 Drawing Sheets

UPLINK SCHEDULING IN A CELLULAR SYSTEM

TECHNICAL FIELD

The present invention discloses a method and a device for Improved uplink scheduling in a cellular system, in particular for an LTE, Long Term Evolution, system.

BACKGROUND

The cellular communications system known as LTE, Long Term Evolution, is a radio access technology for packet-switched services. In the uplink, i.e. traffic from users in a cell to the controlling node, the eNodeB of the cell, all users in the cell share the same physical channel for user data transmission.

The eNodeB is responsible for allocating or scheduling physical channel resources such as, for example, transmission times and frequencies to the users in a cell in order to allow the users (UEs/User Equipments) to transmit data in the uplink.

The scheduling of the physical channel resources to users in LTE should be such that the QoS, Quality of Service, requirements of the individual UEs are fulfilled.

The physical layer in the uplink of LTE is based on time slotted Single-Carrier Frequency Division Multiple Access, SC-FDMA. The single carrier transmission for a single user is based on OFDM, Orthogonal Frequency Division Multiplexing. A time slot, here also referred to as a subframe, has a duration of 1 ms and is divided into 12 or 14 OFDM symbols, depending on the system configuration.

One OFDM symbol comprises a number of subcarriers in the frequency domain, depending on the channel bandwidth. One subcarrier in one OFDM symbol can carry one modulation symbol. For each subframe, the eNodeB makes a scheduling decision in order to determine which UEs that will be allowed to transmit using which resources. The smallest resource unit that can be assigned to a UE is a so called scheduling element, which is a time-frequency unit of the size 180 kHz×1 ms. A user can be assigned a number of scheduling elements in a subframe.

The eNodeB's scheduling decision for a subframe is transmitted downlink on a so called L1/L2 control channel to the UEs in the cell before the uplink data transmissions are made. The messages transmitted on the L1/L2 control channel contain a scheduling grant for each UE that is assigned one or more scheduling elements in the uplink subframe. The uplink grant contains such parameters as the scheduling element resource allocation, the transport-block size, the modulation scheme, and a transmission power adjustment that the UE needs to use.

The downlink L1/L2 control channel is a scarce resource, and therefore the number of scheduling grants that can be transmitted in a subframe is limited.

To aid the scheduling decision-making in eNodeB, the UEs in the cell of the eNodeB periodically transmit buffer status reports and uplink channel quality information reports to the eNodeB. The buffer status report contains information about the number of bytes that the user would like to transmit in the uplink.

Synchronous HARQ is used in the LTE uplink in order to improve the robustness against transmission errors. After a UE has transmitted its user data and the eNodeB has decoded the transmitted user data, a single ACK/NACK bit is sent to the UE. Upon the reception of a NACK, the UE retransmits the user data. The use of synchronous HARQ means that the time between transmission and retransmission is fixed, and known to both the UE and eNodeB, with the benefit that there is no need to send a scheduling grant for the retransmission on the downlink control channel; instead the information in the initial scheduling grant is reused.

Since LTE at present is an emerging technology, there have not as yet been any commercial solutions implemented for the uplink scheduling in the eNodeB. However, such a solution should take into account at least the following system constraints:

The eNodeB can only allocate scheduling elements which are consecutive in frequency to an UE, The time between uplink transmission and retransmission is fixed. This means that retransmissions must be transmitted a fixed number of subframes after the initial transmission.

The downlink L1/L2 control channel resource is a scarce resource. The number of uplink grants that can be transmitted in a downlink subframe depends on the number of OFDM symbols used for the downlink L1/L2 control channel and the channel quality of the UEs that are the intended receivers of the scheduling grants, It is not necessary to transmit a scheduling grant for a retransmission that uses the same scheduling elements, transport block size and modulation scheme as the initial (or previous) transmission, If it is necessary or beneficial, eNodeB may change the set of scheduling elements used for a retransmission by sending a scheduling grant for the retransmission, thereby indicating the scheduling elements that should be used for retransmission, The UEs are in many cases power limited.

SUMMARY

Thus, it is a purpose of the present invention to provide a solution to uplink scheduling in an LTE system which takes into account at least the system constraints listed above.

This is done by means of a method for scheduling uplink transmission resources such as transmission duration and transmission frequency to users in a cell of a cellular system, and grants for the use of uplink transmission resources are sent on a control channel to users in the cell.

The users' uplink transmissions are sent in subframes which have a certain extension in time and frequency. According to the method of the invention, for each of at least a number of subframes, a decision is made on the number of users that will be scheduled resources for uplink transmission in the subframe, the decision being such that the number of users is maximized with respect to the control channel's capacity to transmit uplink grants for that subframe.

Thus, since, according to the method of the invention, the number of users who are scheduled for transmission in a subframe is maximized, this will serve to spread out each user's transmissions over as many subframes as possible, which increases the spectral efficiency for users who have a limitation on the amount of output power that they can use.

In a particular embodiment of the invention, a user who is scheduled for transmission in a subframe is guaranteed at least a certain minimum amount of uplink resources in that subframe. If this principle is applied, "fairness" can be obtained between non-GBR (Guaranteed Bit Rate) users over a longer period of time.

In another embodiment of the invention, which may or may not be combined with the previous embodiment, users who need to retransmit a previous transmission do so with the same uplink resources as their previous transmission which is being repeated unless otherwise notified.

According to the inventive method, when scheduling is carried out for uplink resources to users in a subframe, priority is given to users who need to transmit new data over re-scheduling of users who need to carry out retransmissions. The word "re-scheduling" is here used in the sense of moving a retransmission in frequency as compared to its previous transmission frequency, an operation which will thus be given a relatively low priority according to the present invention In another embodiment of the method, a grant for uplink resources in a subframe comprises a number of scheduling elements of the subframe, each of which element has a certain extension in time and frequency. According to the embodiment, the available scheduling elements in a subframe are used in a manner which minimizes "fragmentation losses" of scheduling elements in the subframe.

Also, with renewed reference to the issue of re-scheduling retransmissions, in one embodiment, if a user is given re-scheduled uplink resources in a subframe for retransmission of a previous transmission (i.e. the retransmissions are moved in frequency), the retransmissions are placed at frequencies which are at the edges of the subframe, i.e. at or adjacent to the highest or lowest frequencies within the subframe. This will further serve to de-fragment the scheduling resources within the subframe.

The invention also discloses a scheduler for an eNodeB for an LTE system in which the invention is used.

BRIEF DESCRIPTION OF THE DRAWINGS

The invention will be described in more detail in the following, with reference to the appended drawings, in which.

DETAILED DESCRIPTION

Figure 1:
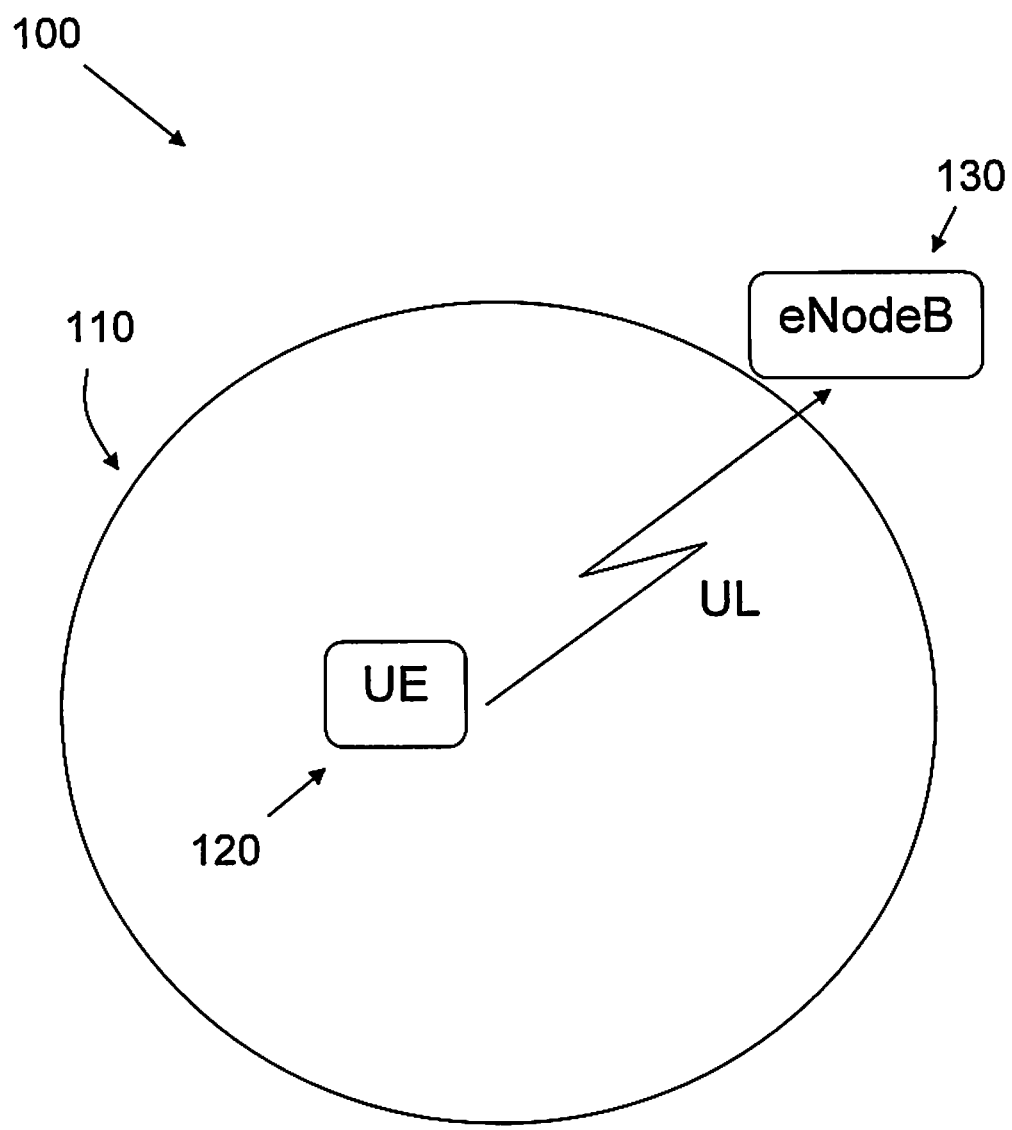
FIG. 1 shows a system in which the invention may be applied.

FIG. 1 shows an example of a system 100 in which the invention may be applied. The system 100 for which the invention is intended is a so called LTE system, Long Term Evolution, and comprises a number of cells, one of which is shown in FIG. 1, with the reference number 110. For each cell in an LTE system there is a controlling node, an eNodeB, shown in FIG. 1 as 130.

Figure 2:
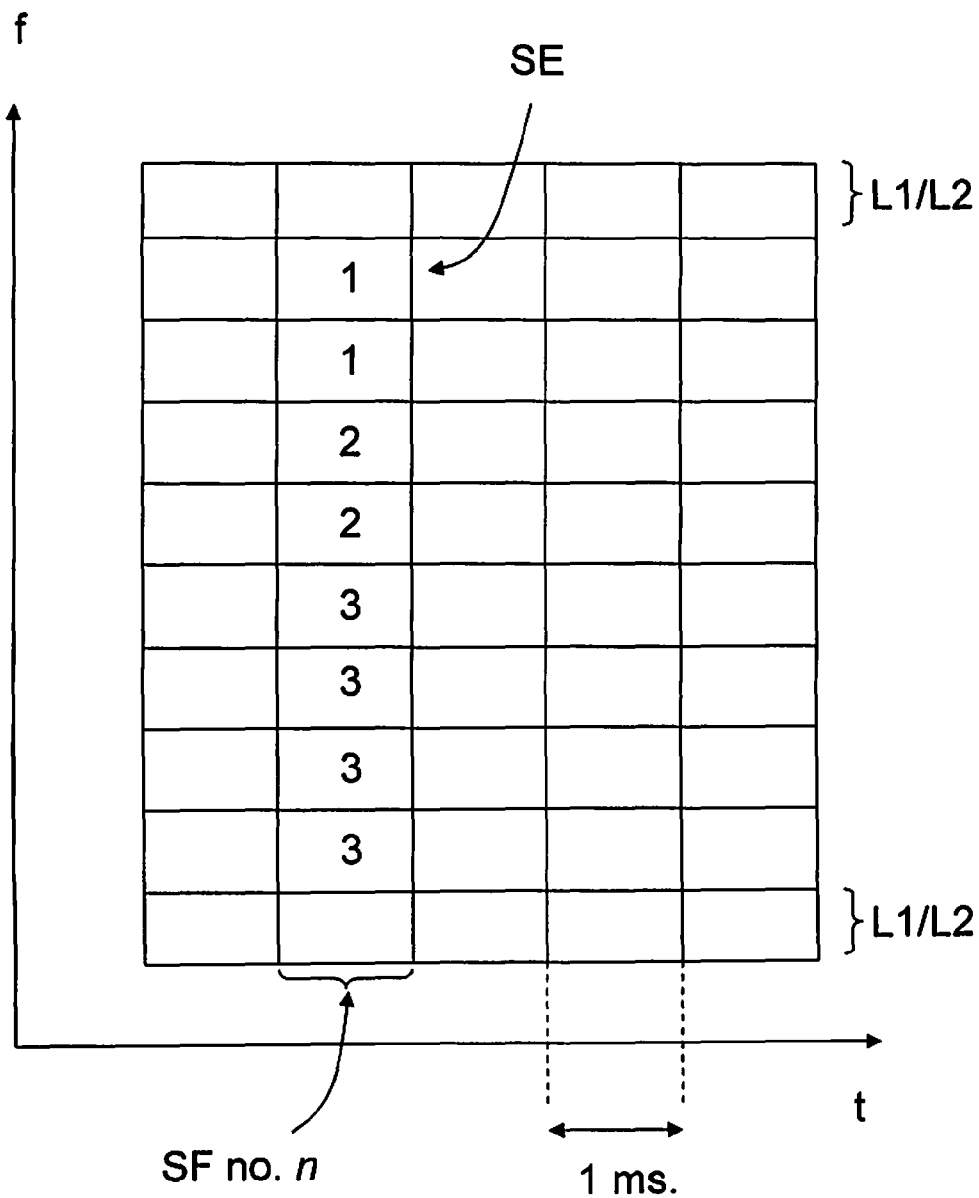
FIG. 2 shows subframes in a system of the invention.

As has emerged from the description above, the physical layer in the LTE uplink, UL, is based on time slotted SC FDMA, Single Carrier Frequency Division Multiple Access, with the time slots also being referred to as subframes. FIG. 2 shows an example of a number of consecutive uplink subframes. As shown in FIG. 2, each subframe has a duration of 1 ms, and extends over a certain frequency spectrum, which is divided into so called subcarriers.

In subframe, SF, number n of FIG. 2, an example is given of how three different UEs, shown as 1-3, may be scheduled in a subframe: the smallest resource unit in a subframe which a UE can be allotted is a so called scheduling element, SE, which is a time-frequency unit with, at present, a size of 180 kHz×1 ms. In the example of FIG. 2, in subframe number n UE 1 has been allotted (scheduled) for two scheduling elements, UE 2 has also been allotted two scheduling elements and UE 3 has been allotted four scheduling elements.

As is also indicated in FIG. 2, the "edge frequencies", i.e. the highest/lowest of the subcarriers of a subframe can be used for control signalling, i.e. L1/L2-signalling.

Figure 3:
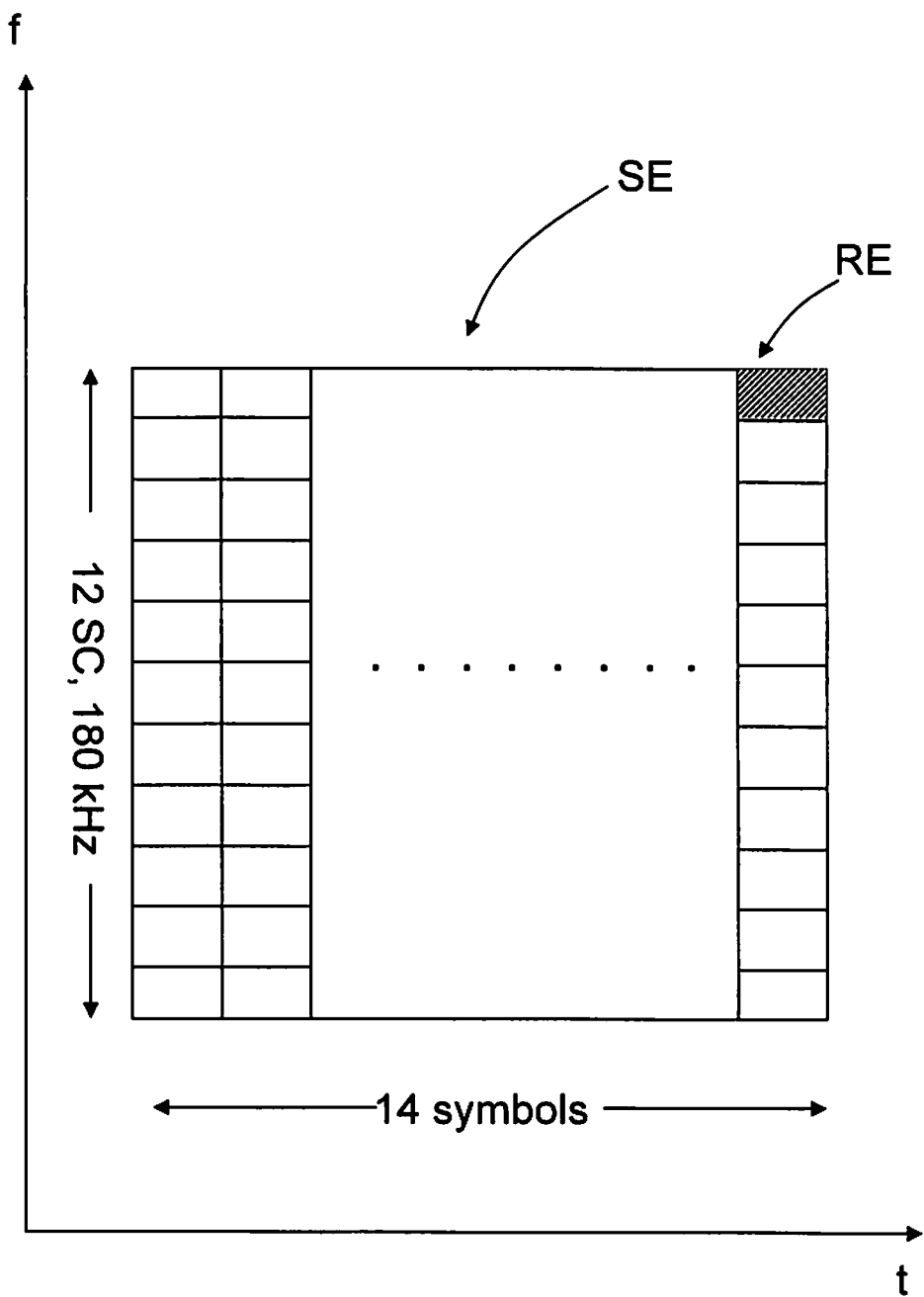
FIG. 3 shows a scheduling element in a system of the invention.

FIG. 3 illustrates a scheduling element, an SE: as indicated in FIG. 3, an SE comprises 14 OFDM symbols, although an SE can comprise other numbers of symbols; for example, 12 symbols in an SE is also common. As also shown in FIG. 3, in frequency an SE extends over a number of subcarriers, SC, with the SE of FIG. 3 extending over 12 subcarriers, which in total cover a frequency spectrum of 180 kHz. A resource unit which comprises one subcarrier frequency over one OFDM symbol is referred to as a Resource Element, RE. One RE is shown as an example in FIG. 3.

As indicated previously in this text, a purpose of the present invention is to provide a scheduling method for uplink scheduling, i.e. for scheduling the UEs in the uplink subframes.

Figure 4:
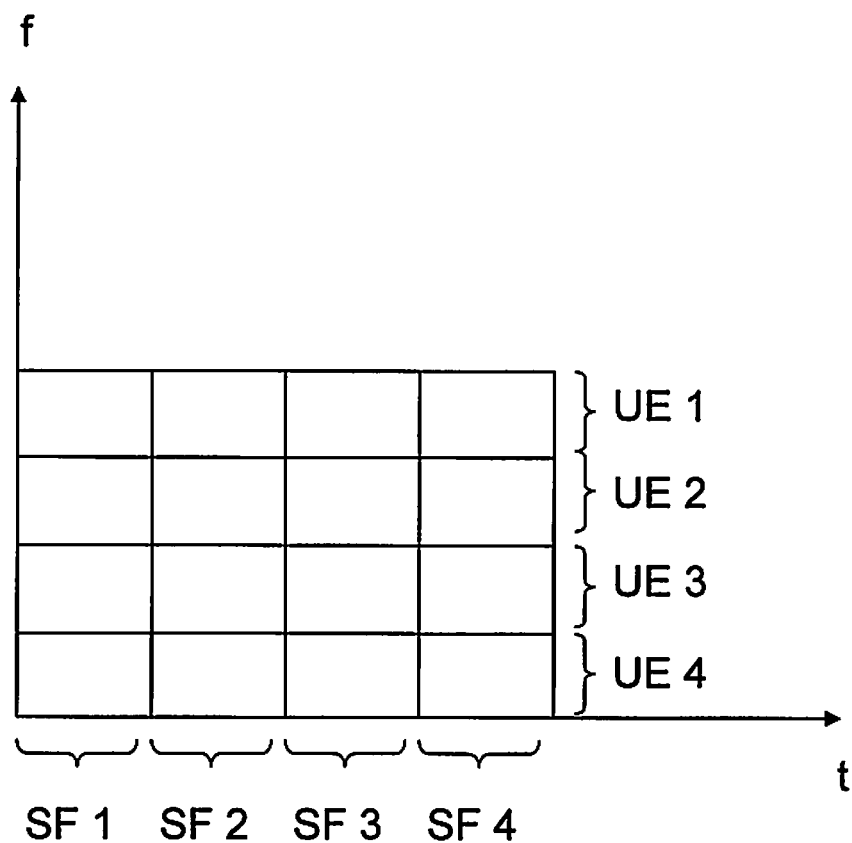
FIG. 4 shows an example of scheduling according to the invention.

Some principles of the method of the invention, which will be explained in depth in the following, are as follows:

1) The method is performed once for each subframe, with the goal of arriving at a scheduling decision which is such that the transmission of each scheduled UE is spread out over time, i.e. in more than one subframe, suitably but not necessarily consecutive subframes. This principle increases the spectral efficiency for power limited UEs. Exceptions can be made, if, for example, a UE does not have more than a certain amount of data to transmit. FIG. 4 shows an example of how four UEs, UE 1-4 are spread out over 4 consecutive subframes.

In one embodiment of the invention, principle 1) above can be combined with the following:

2) In many cases, only a few UEs can be granted uplink resources in a subframe due to the fact that the L1/L2 control channel resource is a scare resource. If this is the case, preference is given to using the L1/L2 control channel resource for granting new data transmissions rather than for scheduling grants for moving retransmissions in frequency. This will cause the transmissions in a subframe to be spread out as much as possible when only a few UEs can be granted per subframe, which will increase the spectral efficiency of the system for UEs which are power limited.

Other steps which may also in various embodiments be combined with steps 1 and 2 are steps 3, 4 and 5 below:

3) If L1/L2 control channel resources are available, retransmissions are moved in frequency. The purpose is to further de-fragment the scheduling element resource.

4) The UEs which are selected for uplink scheduling in a subframe are given a certain minimum resource "guarantee" in that subframe. This means that it is, for example, possible to achieve "fairness" between non-GBR, Guaranteed Bit Rate, UEs over a longer period of time.

5) It is always attempted to avoid fragmentation losses of the available scheduling elements.

The invention is suitably carried out in a scheduling function in an LTE eNodeB, i.e. in a function which has one of its duties to allocate uplink scheduling elements to the UEs in a cell for which the eNodeB is the controlling node.

As indicated above, the scheduling function preferably carries out the inventive method once for each subframe. When making the scheduling decisions, the scheduling unit takes into account such parameters as, for example, the priority weight of each UE, which, in turn is calculated based on the QoS requirements of the UE, channel quality information, buffer status, time since last served etc. The result is the uplink scheduling grants in the subframe. For each UE that is assigned an uplink grant in a certain subframe, the grant comprises the allocated scheduling element list, the modulation scheme, the transport block size, and the power adjustment. These parameters will be explained in more detail in the following As mentioned previously, one of the principles of the invention is to spread out the uplink scheduling element allocations for UEs over time, particularly for those UEs which are power limited. The benefit of spreading out the allocation of, in particular, power limited UEs over time is that in many cases the throughput for the UEs will be increased significantly. As the uplink scheduler of eNodeBs in LTE works on a subframe basis, the invention lets a scheduling decision made in a single subframe possibly result in allocations for a UE being spread out over time, i.e. in that the UE will receive uplink grants in more than one subframe.

Spreading out the uplink allocations is achieved by, where appropriate, scheduling several users in each subframe, for example given that there are several users in the cell, and also given that the users in the cell have more than a certain amount of data to transmit. Since the L1/L2 control channel is a scare resource which limits the number of users that can be assigned uplink scheduling elements in a subframe, in the method of the invention, it is attempted to schedule as many users in a subframe as the L1/L2 control channel resource allows.

In order to efficiently use the scheduling element resource and make the scheduling algorithm simple, the number of UEs that should be scheduled in a subframe is determined before the uplink scheduling elements are assigned.

In a preferred embodiment, the method of the invention is divided into a number of stages which will be described briefly below, followed by a detailed description:

In a first stage, it is determined how many UEs that may be scheduled in the subframe in question, considering the L1/L2 control channel resource limitation. Based on priority weights, a set of UEs to schedule is selected. An objective of this stage is to ensure that the uplink allocations are spread out over time in an appropriate manner.

In a second stage, the available scheduling element resource is divided into smaller units, here denoted as 'islands'. The number of islands is the same as the number of UEs that should be scheduled in the subframe. An objective of this stage is to ensure that a degree of "fairness" between UEs is achieved. The size of an island restricts the number of scheduling elements that can be assigned to a UE in a third stage, which is described below.

In a third stage, the scheduler in the eNodeB, which is where the method is suitably implemented, works on a "per-UE" basis. UEs are assigned to islands iteratively, one assignment in each iteration. If a UE is power or buffer limited, the UE might not use all of the scheduling elements within the island. After an assignment, a check is carried out to see if it is possible to schedule additional UEs within the island.

In a fourth stage, any uplink scheduling elements that have not been assigned to a UE (due to power or buffer limitation), are assigned to UEs that can make valid use of the scheduling elements. The objective of this is to achieve as high a degree of resource utilization as possible.

Figure 5:
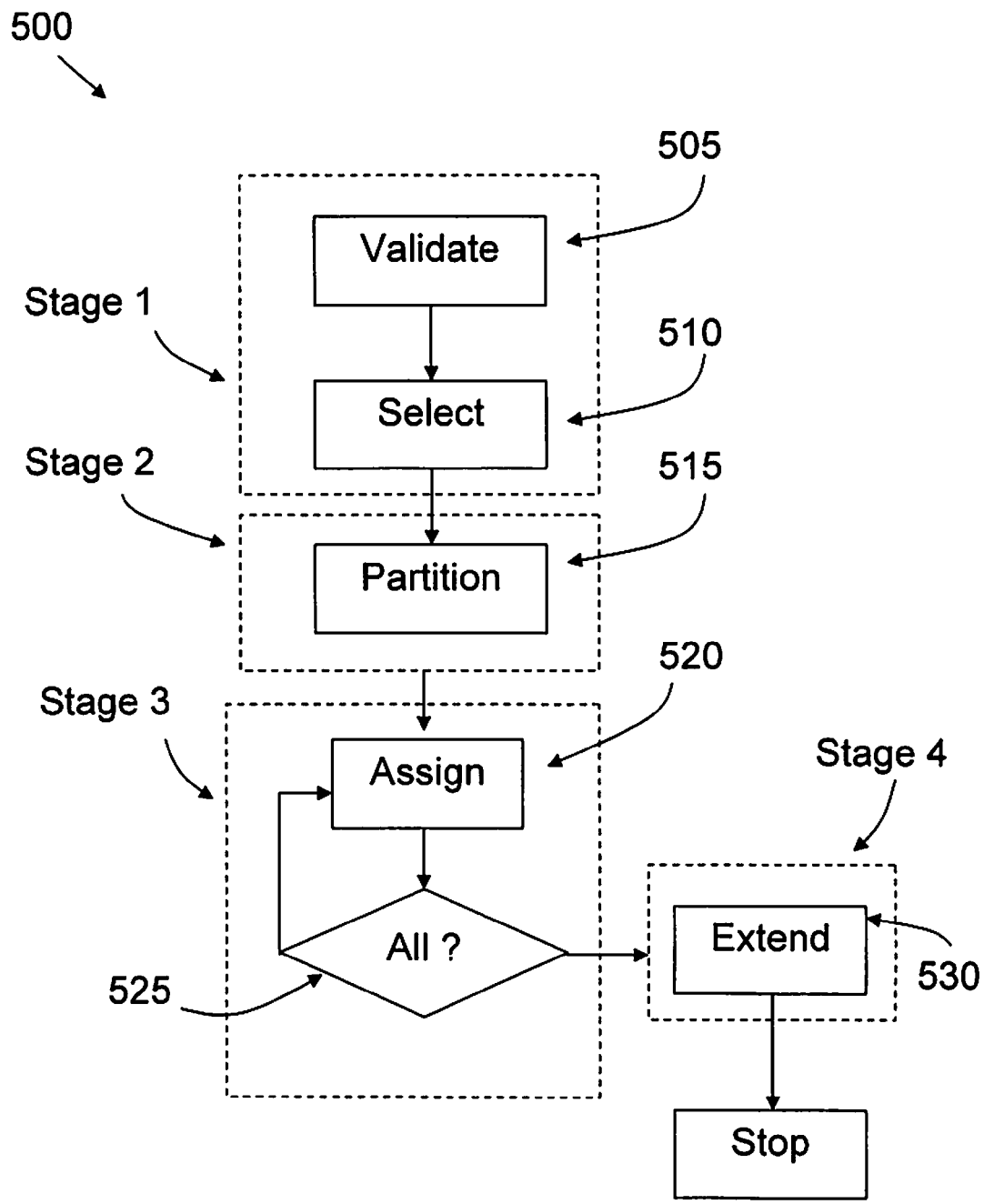
FIG. 5 shows a flow chart of an embodiment of the invention.

A preferred embodiment of the method of the invention is shown in the flow chart of FIG. 5. In FIG. 5, it is also indicated which of the steps in the flow chart that belong to the different stages listed above.

The steps shown in FIG. 5 are as follows:
Control channel resource validation, step 505,
Select UEs to schedule based on priority, step 510,
Partition the scheduling element resource, step 515
Assign UEs to suitable free islands, step 520,
Check if all selected UEs have been assigned to an island, step 525,
Extend the allocation (if possible), step 530.

It should be noted that step 505 of the flow chart of FIG. 5 can also be carried out independently, or in combination with one or more of steps 510-530. However, in a preferred embodiment, the method of the invention comprises the steps listed above.

The various steps of the flow chart will be explained in more detail below:
Control Channel Resource Validation, Step 505

A purpose of this step is to assign uplink resource transmission grants to as many UEs as possible in the subframe which is being processed, which will serve to "spread out" the transmissions from each UE over as many subframes as possible. The number of UEs that can be assigned grants is mainly restricted by the downlink L1/L2 control channel.

The downlink L1/L2 control channel is used to transmit scheduling grants to the UEs in the cell from the eNodeB of the cell. The downlink L1/L2 control channel resource comprises resource elements which correspond to the 1-3 first OFDM symbols in a downlink subframe.

For the LTE uplink, so called synchronous HARQ is used, which means that retransmissions must be transmitted a fixed number of subframes after the corresponding initial transmission. However, according to the present invention, the scheduler, which is preferably located in the eNodeB, can choose to either place retransmissions in the same scheduling elements as the initial transmission, or to move the retransmission in frequency.

If the scheduler decides to leave a retransmission in place and to use the same modulation and coding format as the initial transmission, it is not necessary to send a scheduling grant, which will save L1/L2 control channel resources, which in most cases means that it is possible to schedule additional UEs in the subframe. However, leaving retransmissions "in place" causes a fragmentation of the scheduling element resources in frequency. This fragmentation places restrictions on the assignment of UEs to the scheduling elements of a subframe.

Moving a retransmission will require a scheduling grant, which in turn requires downlink L1/L2 control channel resources. If a retransmission is moved in frequency, the number of UEs that can be scheduled in the subframe might decrease. Since a purpose of the invention is to schedule as many UEs in a subframe as the L1/L2 control channel resource allows, retransmissions are only moved if the number of UEs with data to transmit in the subframe is less than the number of scheduling grants that can be transmitted for the subframe.

In other words, in a preferred embodiment of the invention, retransmissions are only moved if the L1/L2 control channel resource cannot be used to schedule additional UEs in the subframe. Another way of expressing this is that in a preferred embodiment, priority is given to scheduling users who need to transmit new data over re-scheduling users who need to carry out retransmissions.

The inventive mechanism for moving a retransmission in frequency will now be explained in more detail using an example, and with reference to FIGS. 6 and 7:

Example 1

Assume that there are six UEs in a cell, and that two of the UEs, A and B, need to send retransmissions in the subframe for which the scheduling method of the invention is used, while the remaining four UEs need to transmit new data in the subframe.

Assume further that five uplink scheduling grants can be transmitted. This means that four scheduling of the available five grants are needed for the transmission of new data, and that one scheduling grant is available for an allocation that moves a retransmission. Thus, either retransmission A or retransmission B may be moved.

Figure 6:
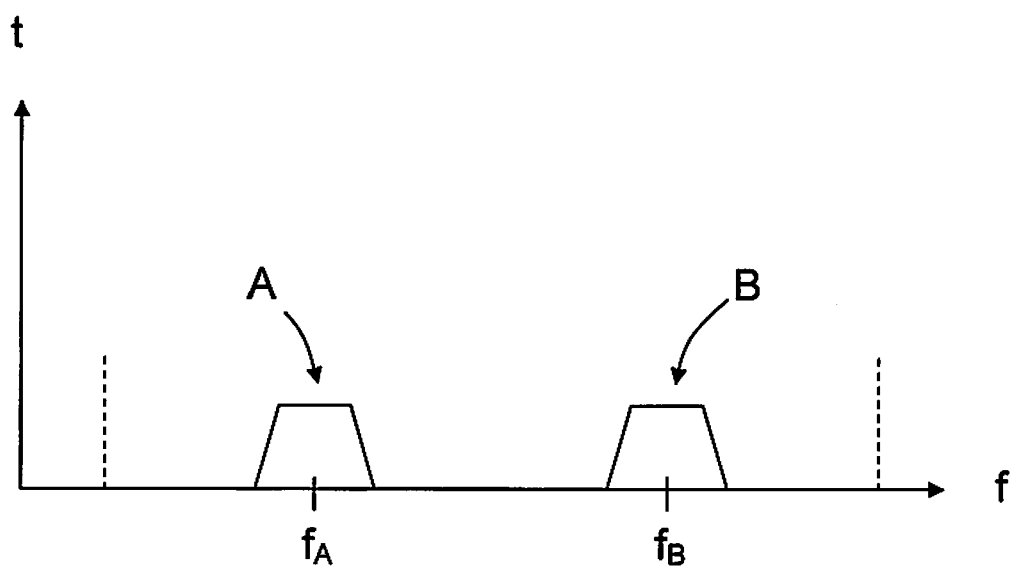
FIGS. 6-9 show examples of scheduling according to the invention.
Figure 7:
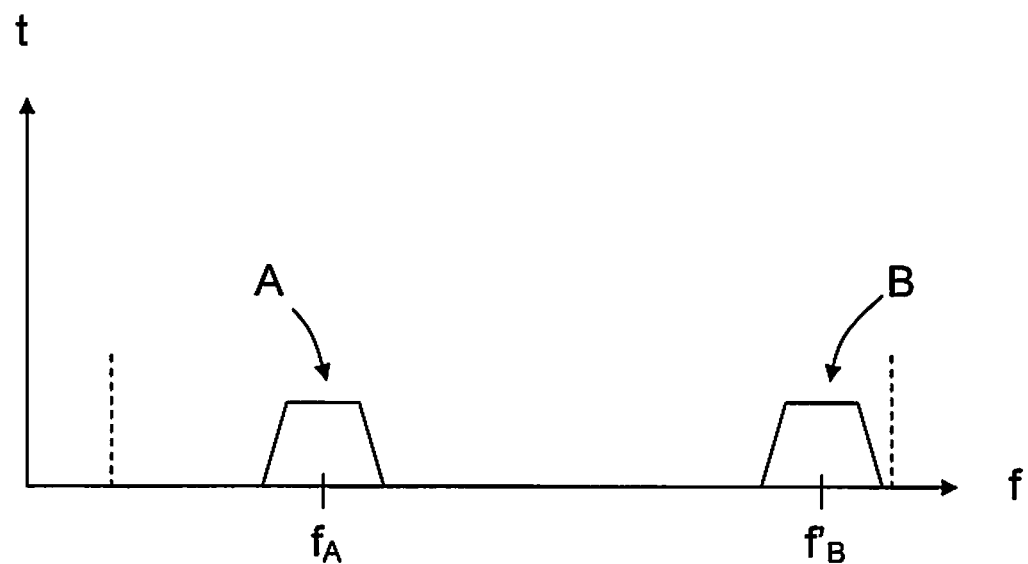

FIG. 6 shows the location in frequency of the initial transmissions A and B, at frequencies $f_A$ and $f_B$. In this example, the scheduler chooses to move the rightmost retransmission to the right edge of the subframe, i.e. retransmission B is moved to frequency $f'_B$, as shown in FIG. 7, while retransmission A remains at the same frequency, i.e. $f_A$.

In this example, only one of the retransmissions A and B could be moved in frequency compared to their previous frequency. In such a case, i.e. when a choice has to be made between two retransmissions regarding which one of them that should be moved, the method of the invention will lead to a choice of moving the retransmission which will lead to a minimization of fragmentation losses in the subframe. Fragmentation losses occur, for example, if it is necessary to retransmit data, and the previous transmission of that data was allocated scheduling elements in the middle of the frequency band. By default, retransmissions should be located on the same frequency as their corresponding previous transmission. As a UE must be allocated consecutive scheduling elements, the default allocation of retransmissions puts restrictions on the allocation of other transmissions.

The purpose of moving the retransmissions in frequency is to de-fragment the scheduling element resource as much as possible before starting to assign UEs to scheduling elements.

In this step of the method, i.e. the step shown as 505 in FIG. 5, the L1/L2 control channel resource "cost" of sending scheduling grants to the different UEs is evaluated. This information is given as input to the step shown as 510 in FIG. 5, i.e. the step where selection of UEs to schedule is made based on priority, as described below.

One example of the notion of the "costs" of sending scheduling grants is as follows: in connection with the description of FIG. 3, the term "resource element" was explained. In order to send a grant to a UE, the number of resource elements might vary, depending on, for example, the UE's distance to the eNodeB. Thus, in this example, the cost of sending a grant is the number of resource elements needed to send the grant.

Selection of UEs to Schedule Based on PQ Priority, Step 510

A purpose of this step, i.e. step 510 of FIG. 5, is to select UEs for scheduling in the subframe whose scheduling is being processed. The exact criterion for selecting UEs may be varied, but the downlink L1/L2 control channel resource cost of sending a scheduling grant to the different UEs may preferably be a part of the decision. The decision can, for example, also be based on the priority weights of the UEs and the UE buffer status.

Partitioning the Scheduling Element Resource, Step 515

In the step described above, it was decided how many UEs that should be scheduled in the subframe. In this step we divide the physical resource into unallocated "islands" such that each UE can be assigned to an unallocated island. The purpose of partitioning the scheduling units into unallocated islands is to make sure that each UE that should be scheduled is assigned at least some scheduling elements.

We introduce the following notations for use in this description:

A free fragment is the set of adjacent scheduling elements located between retransmission allocations and/or frequency band edges.

A free fragment contains one or more unallocated islands. An unallocated island is a logical concept and is not mapped to specific scheduling elements in frequency. Each unallocated island has a size corresponding to one or more scheduling elements. This size is referred to as the island element size.

When a UE is assigned to an unallocated island, the unallocated island becomes an allocation.

The unallocated islands are partitioned such that the size of the islands is roughly the same. An unallocated island can only belong to one free fragment.

The method for partitioning the scheduling element resource is as follows:

Find the set of free fragments, (consecutive Scheduling Elements not yet assigned), and sort this set in decreasing order regarding size. The set of free islands, denoted $I_c$, is set to be equal to the set of free fragments. If the number of islands, $I_c$, is less than the number of selected UEs, $K_c$, then increase the number of islands by splitting the largest island into 2 equally sized islands. Sort the 2 new islands into $I_c$. Continue to increase the number islands until $I_c = K_c$.

This principle will now be explained using an example, and with reference to FIG. 8.

Partitioning the Scheduling Element Resource, Example

This example will describe how the scheduling elements in a subframe are partitioned into unallocated islands. Assume that the scheduling function has decided to schedule four UEs in a subframe. In such a case, four unallocated islands will be created by the scheduling function.

Figure 8:
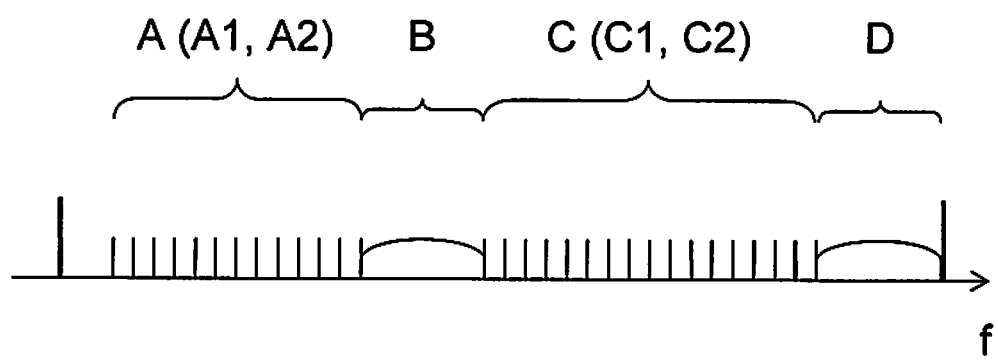

FIG. 8 shows an example of how the four unallocated islands could be partitioned in to unallocated islands. In the subframe shown in FIG. 8, there is a first free fragment A which consists of unallocated islands A1 and A2, and a second free fragment C which consists of unallocated islands C1 and C2, while the subframe also comprises two frequency ranges B and D which are already occupied by retransmissions.

The unallocated island A1 comprises five scheduling elements, and A2 comprises seven scheduling elements. Island C1 comprises 8 scheduling elements, and C2 comprises nine scheduling elements.

Assign UEs to a Suitable Free Island, Step 520

Suitably, the scheduler which works according to the inventive method functions in a loop on a "per UE" basis. With each turn in the loop, a UE is assigned to an unallocated island. The exact criteria for assigning UEs to unallocated islands may vary, but in one embodiment, a UE is assigned to the island which has the best fit of the unallocated islands, i.e. the best match between the island size and the UE's transmission needs.

Before a UE is assigned to an unallocated island, a link adaptation calculation is made in order to determine the number of scheduling elements that should be used for that UE. As a minimum, the UE is guaranteed the use of at least one scheduling element, and at the most, the UE will (in this step) be assigned a number of scheduling elements which corresponds to the island's size.

The number of assigned scheduling elements may also be restricted by the fact that the UE only has a small amount of data to transmit, and/or the fact that the UE can at least transmit an amount of data which is equal to the minimum grant size ($G_{min}$) and/or that the SINR (Signal to Interference and Noise Ratio) becomes lower than $SINR_{min}$.

The $SINR_{min}$ is a threshold for link adaptation. If SINR is below $SINR_{min}$, it will not be possible to reach a required block error rate even with the most robust coding and modulation scheme. For all of the assigned scheduling elements, SINR must be larger than $SINR_{min}$. This means that a power limited UE might therefore not be assigned all of the scheduling elements of an unallocated island.

If a UE is assigned less scheduling elements than the island element size, the remaining scheduling elements in the island are added to other unallocated islands within the same free fragment. If there are no more unallocated islands within the subframe, the scheduling elements will be considered as "free scheduling elements" within the free fragment. How UEs may be assigned to free islands will now be explained below with the aid of an example, and with reference to FIG. 9.

Assigning UEs to Islands, Example

In this example, use is initially made of the example of FIG. 8. Thus, four UEs are to be assigned to four unallocated islands. In an initial iteration, the UE with the highest priority weight (based on, for example, such parameters as channel quality, the amount of data in the UE's buffer and the latency of the data in the buffer size, although these are merely examples) is assigned to a suitable unallocated island. In the present example, this UE, denoted as UE1, only has a small amount of data to send, and thus only 3 scheduling elements are assigned to this UE. The UE is assigned to unallocated island A1 in free fragment A of FIG. 8.

Figure 9:
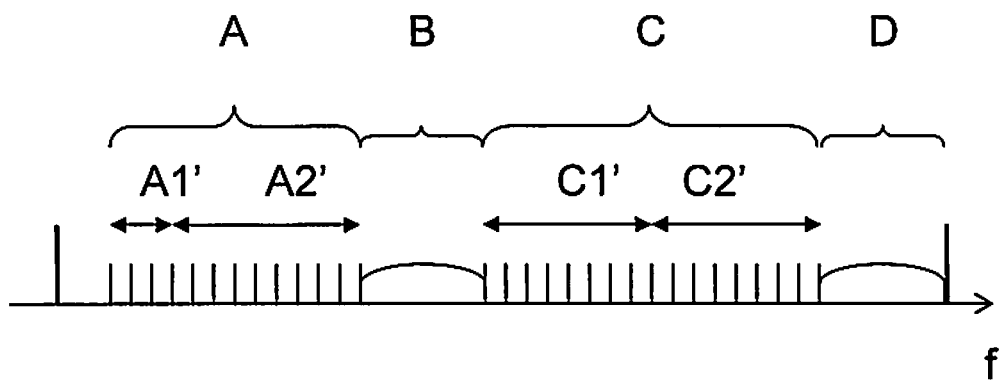

FIG. 9 shows that the first ("highest priority") UE has been allocated 3 scheduling elements in A1. As the UE could not use all of the scheduling elements in unallocated island A1, the remaining 2 scheduling elements are assigned to unallocated island A2. Islands A1 and A2 from FIG. 8 are now denoted A1' and A2', due to the change in size.

In a second iteration in the scheduling, the UE that has the second highest priority is assigned to unallocated island A2'. This UE is not buffer or power limited, and can therefore use all of the 9 (7+2) scheduling elements in unallocated island A2'.

In a third iteration, the third UE is assigned to unallocated island C1, and is assigned all of the scheduling elements in that island.

In a fourth iteration, a fourth UE is processed. In order to illustrate how power limited UEs may be handled by means of the present invention, it is here assumed that the fourth UE is severely power limited, and can thus use only one scheduling element. The fourth UE is accordingly assigned one of the scheduling elements of island C2.

At this point, free fragment C does not comprise any unallocated islands, and therefore the remaining scheduling seven elements of island C2 are listed as unallocated scheduling elements in free fragment C2.

Extension of Allocations, Step 530

If all of the scheduling elements of the subframe which is being "processed" haven't been assigned to a UE when the above described steps are terminated, one or more of the UEs which have been assigned scheduling elements may be assigned additional scheduling elements.

The notion of extending an allocation will be described below with the aid of an example.

Extension of Allocations, Example

This example continues with the scenario from the previous example, i.e. the example of FIG. 9. In this step of the inventive scheduling method, the seven free scheduling elements in fragment C that were not allocated to any UE will, if possible, be assigned to a UE. The eNodeB knows that allocation C2 does not have a need for additional scheduling elements, since the UE of that allocation was extremely power limited. Therefore the scheduler of the eNodeB attempts to extend allocation C1. In this example the UE assigned to allocation C1 was not buffer limited or power limited, and therefore allocation C1 can be extended with the seven free scheduling elements.

Figure 10:
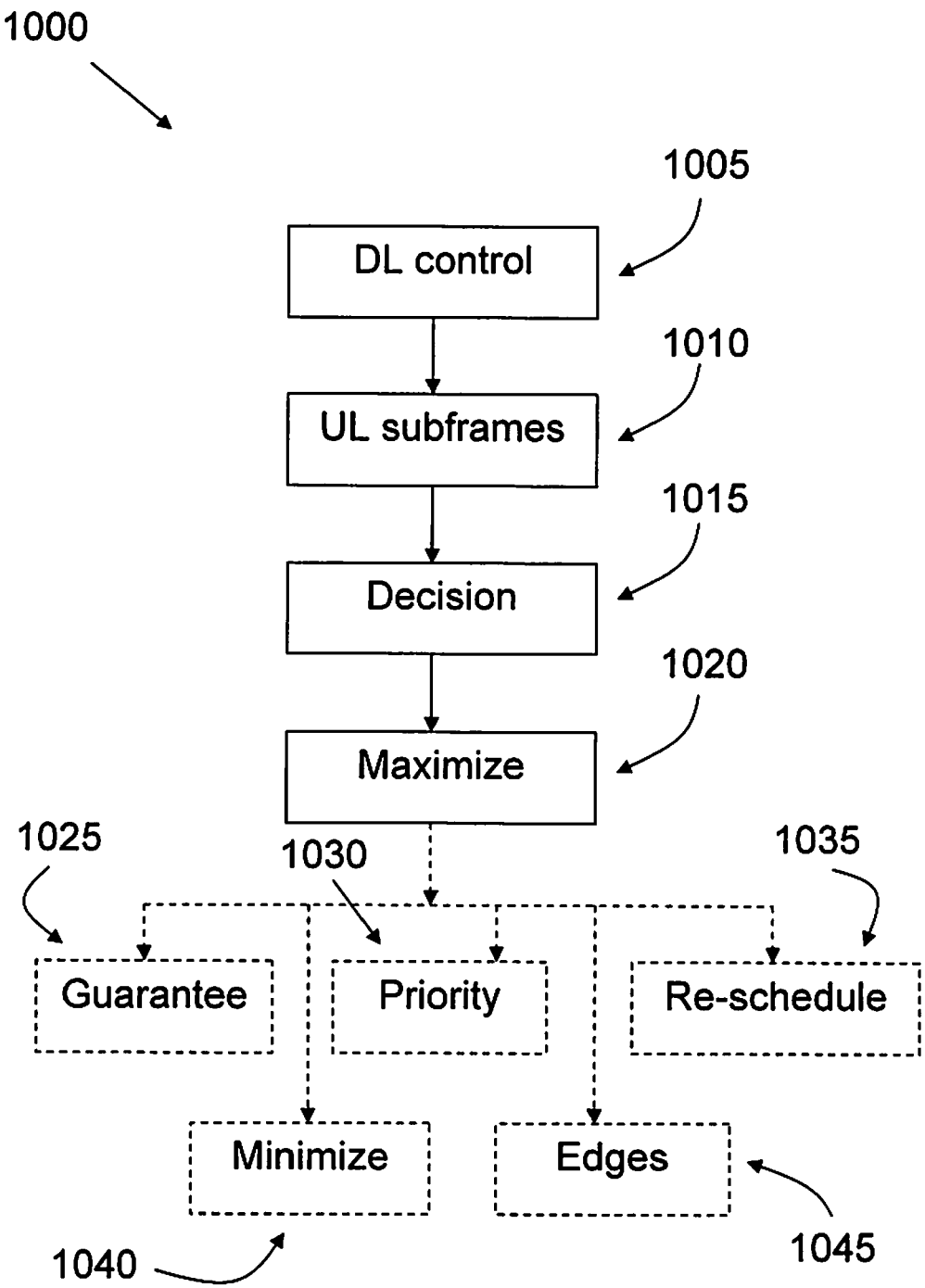
FIG. 10 shows a flow chart of a generalized method of the invention.

FIG. 10 shows a schematic flow chart of a generalization 1000 of the method of the invention. Steps which are options or alternatives are indicated with dashed lines. As has emerged from the description above, the method 1000 is intended for scheduling uplink transmission resources such as transmission duration and frequency to users in a cell of a cellular system.

As indicated in step 1005, grants for the use of uplink transmission resources are sent on a downlink control channel to users in the cell, and as indicated in step 1010, the users' uplink transmissions are sent in subframes which have a certain extension in time and frequency.

According to the inventive method, as shown in step 1015, for each of at least a number of subframes, a decision is made on the number of users that will be scheduled resources for uplink transmission in the subframe, so that, as shown in step 1020, said number of users is maximized with respect to the control channel's capacity to transmit uplink grants for that subframe.

Step 1025 shows that in one embodiment of the invention, a user who is scheduled for transmission in a subframe is guaranteed at least a certain minimum amount of uplink resources in that subframe.

In another embodiment of the invention, which is indicated in step 1030, unless otherwise notified, users who need to retransmit a previous transmission do so with the same uplink resources as the previous transmission, and when scheduling is made of the downlink control channel to users for uplink transmissions in a subframe, priority is given to users who need to transmit new data over re-scheduling users who need to carry out retransmissions.

Step 1035 shows that in one embodiment, users who need to retransmit previous transmissions are re-scheduled in frequency if downlink control channel resources for this are available when users who need to transmit new data have been given the appropriate resources.

As indicated in step 1040, in another embodiment of the invention, a grant for uplink resources in a subframe comprises a number of scheduling elements, each of which has a certain extension in time and frequency, and the available scheduling elements in a subframe are used in a manner which minimizes fragmentation losses of scheduling elements in the subframe.

Also, as shown in step 1045, in one embodiment of the invention, if a user is given uplink resources in a subframe for retransmission of a previous transmission, the retransmissions are placed at frequencies which are at the edges of the subframe, i.e. at or adjacent to the highest or lowest frequencies within the subframe.

The invention also discloses a scheduling node for use in a cellular system in which the invention is applied. In a preferred embodiment, the inventive scheduling node is employed in a controlling node of the system, e.g. an eNodeB of an LTE system, although the scheduling node of the invention can of course also be employed in other nodes of the system.

Figure 11:
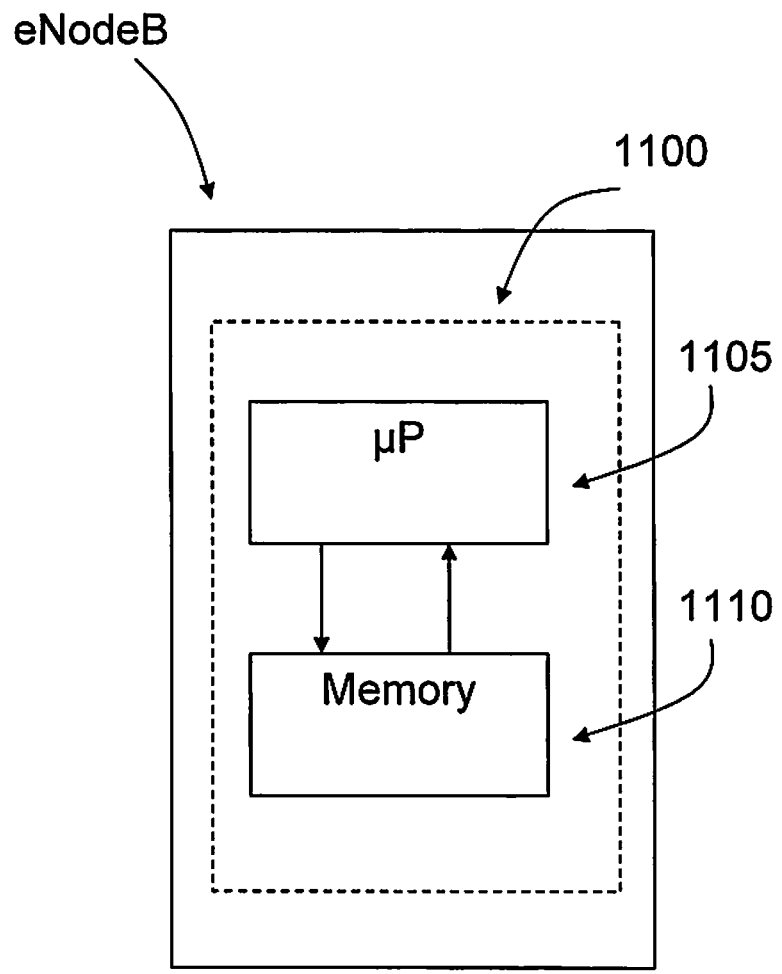
FIG. 11 shows a scheduler of the invention.

The scheduling node will mainly be embodied in software, so that it will be stored in a memory from which it can be accessed by a computer. For this reason, FIG. 11, which schematically shows an example of an embodiment of a scheduling node 1100 of the invention, shows the scheduling node 1100 inside an eNodeB, in a memory 1100 and a processor such as a microprocessor 1105. It should however, again be emphasized that the location of the scheduling node in an eNodeB of an LTE system as shown in FIG. 11, is merely an example of a device in which the inventive scheduling node 1100 can be utilized.

As has also emerged from the description above, the scheduling node 1100 is intended for scheduling uplink transmission resources such as transmission duration and frequency to users in a cell of a cellular system.

Grants for the use of uplink transmission resources are sent on a downlink control channel to users in the cell and the users' uplink transmissions are sent in subframes which have a certain extension in time and frequency.

For each of at least a number of subframes, the scheduling node 1100 makes a decision on the number of users that will be scheduled resources for uplink transmission in the subframe, so that this number of users is maximized with respect to the control channel's capacity to transmit uplink grants for that subframe.

In one embodiment, the scheduling node 1100 is adapted to guarantee a user who is scheduled for transmission in a subframe at least a certain minimum amount of uplink resources in that subframe.

In another embodiment, the scheduling node 1100 gives priority to users who need to transmit new data over re-scheduling users who need to carry out retransmissions, when scheduling is made of the downlink control channel to users for uplink transmissions in a subframe, In this embodiment, the scheduling node re-schedules (in frequency) users who need to retransmit previous transmissions if downlink control channel resources for such re-scheduling are available when users who need to transmit new data have been given the appropriate resources.

In a further embodiment, the scheduling node 1100 is adapted to let a grant for uplink resources in a subframe comprise a number of scheduling elements, each of which has a certain extension in time and frequency, and which use the available scheduling elements in a subframe in a manner which minimizes fragmentation losses of scheduling elements in the subframe.

Also, in one embodiment, the scheduling node 1100 places the retransmissions at frequencies which are at the edges of the subframe, i.e. at or adjacent to the highest or lowest frequencies within the subframe, if a user is given re-scheduled (i.e. altered with respect to the previous transmission) uplink resources in a subframe for retransmission of a previous transmission, As pointed out previously, the scheduling node 1100 is preferably for use in an LTE system, Long Term Evolution, so that the control channel mentioned is the L1/L2 control channel of LTE.

Also, in a preferred embodiment, the scheduling node 1100 is used in an LTE eNodeB.

The invention is not limited to the examples of embodiments described above and shown in the drawings, but may be freely varied within the scope of the appended claims.

The invention claimed is:

1. A method for scheduling uplink transmission resources to users in a cell of a cellular system, wherein grants for the use of uplink transmission resources are sent on a downlink control channel to users in the cell and users' uplink transmissions are sent in subframes which have a certain extension in time and frequency, the method comprising, for each of a plurality of subframes, maximizing the number of users scheduled resources for uplink transmission in the subframe with respect to the downlink control channel's capacity to transmit grants for that subframe.

2. The method of claim 1, wherein said maximizing comprises maximizing the number of users scheduled resources while guaranteeing a user scheduled for transmission in the subframe at least a certain minimum amount of uplink resources in that subframe.

3. The method of claim 1, wherein, unless otherwise notified, a user needing to retransmit a previously sent uplink transmission does so using the same uplink resources as those used for the previously sent uplink transmission, and wherein said maximizing comprises giving priority to users needing to transmit a new uplink transmission for the first time over users needing to retransmit a previously sent uplink transmission.

4. The method of claim 3, wherein said maximizing comprises re-scheduling in frequency a user needing to retransmit a previously sent uplink transmission, if downlink control channel resources are available for that user after allocating downlink control channel resources to users needing to transmit new uplink transmissions for the first time.

5. The method of claim 1, wherein a grant for the use of uplink transmission resources in a subframe comprises a grant for the use of a number of scheduling elements in that subframe, each scheduling element having a certain extension in time and frequency, and wherein said maximizing the number of users comprises minimizing fragmentation of scheduling elements in the subframe.

6. The method of claim 1, wherein said maximizing comprises re-scheduling a user needing to retransmit a previously sent uplink transmission by scheduling the retransmission at frequencies which are at or adjacent to the highest or lowest frequencies within the subframe.

7. The method of claim 1, wherein the cellular system comprises a Long Term Evolution (LTE) system, and wherein said downlink control channel comprises an L1/L2 control channel of the LTE system.

8. The method of claim 1, wherein said uplink transmission resources comprise at least one of transmission duration and transmission frequency.

9. A scheduling node for scheduling uplink transmission resources to users in a cell of a cellular system, wherein grants for the use of uplink transmission resources are sent on a downlink control channel to users in the cell and users' uplink transmissions are sent in subframes which have a certain extension in time and frequency, the scheduling node comprising a processor configured to, for each of a plurality of subframes, maximize the number of users scheduled resources for uplink transmission in the subframe with respect to the downlink control channel's capacity to transmit grants for that subframe.

10. The scheduling node of claim 9, wherein the processor is configured to maximize the number of users scheduled resources while guarantying a user scheduled for transmission in the subframe at least a certain minimum amount of uplink resources in that subframe.

11. The scheduling node of claim 9, wherein the processor is configured to give priority to users needing to transmit a new uplink transmission for the first time over users needing to retransmit a previously sent uplink transmission.

12. The scheduling node of claim 11, wherein the processor is configured to re-schedule in frequency a user needing to retransmit a previously sent uplink transmission, if downlink control channel resources are available for that user after allocating downlink control channel resources to users needing to transmit new uplink transmissions for the first time.

13. The scheduling node of claim 9, wherein a grant for the use of uplink transmission resources in a subframe comprises a grant for the use of a number of scheduling elements in that subframe, each scheduling element having a certain extension in time and frequency, and wherein the processor is configured to minimize fragmentation of scheduling elements in the subframe.

14. The scheduling node of claim 9, wherein the processor is configured to re-schedule a user needing to retransmit a previously sent uplink transmission by scheduling the retransmission at frequencies which are at or adjacent to the highest or lowest frequencies within the subframe.

15. The scheduling node of claim 9, wherein the cellular system comprises a Long Term Evolution (LTE) system, and wherein said downlink control channel comprises an L1/L2 control channel of the LTE system.

16. The scheduling node of claim 9, wherein the scheduling node is included in an LTE eNodeB.

17. The scheduling node of claim 9, wherein said uplink transmission resources comprise at least one of transmission duration and transmission frequency.

18. The scheduling node of claim 9, wherein the cellular system includes a device that has a memory and said processor, the memory being configured to store software that when executed by the processor implements the scheduling node.

* * * * *